Figure 1:
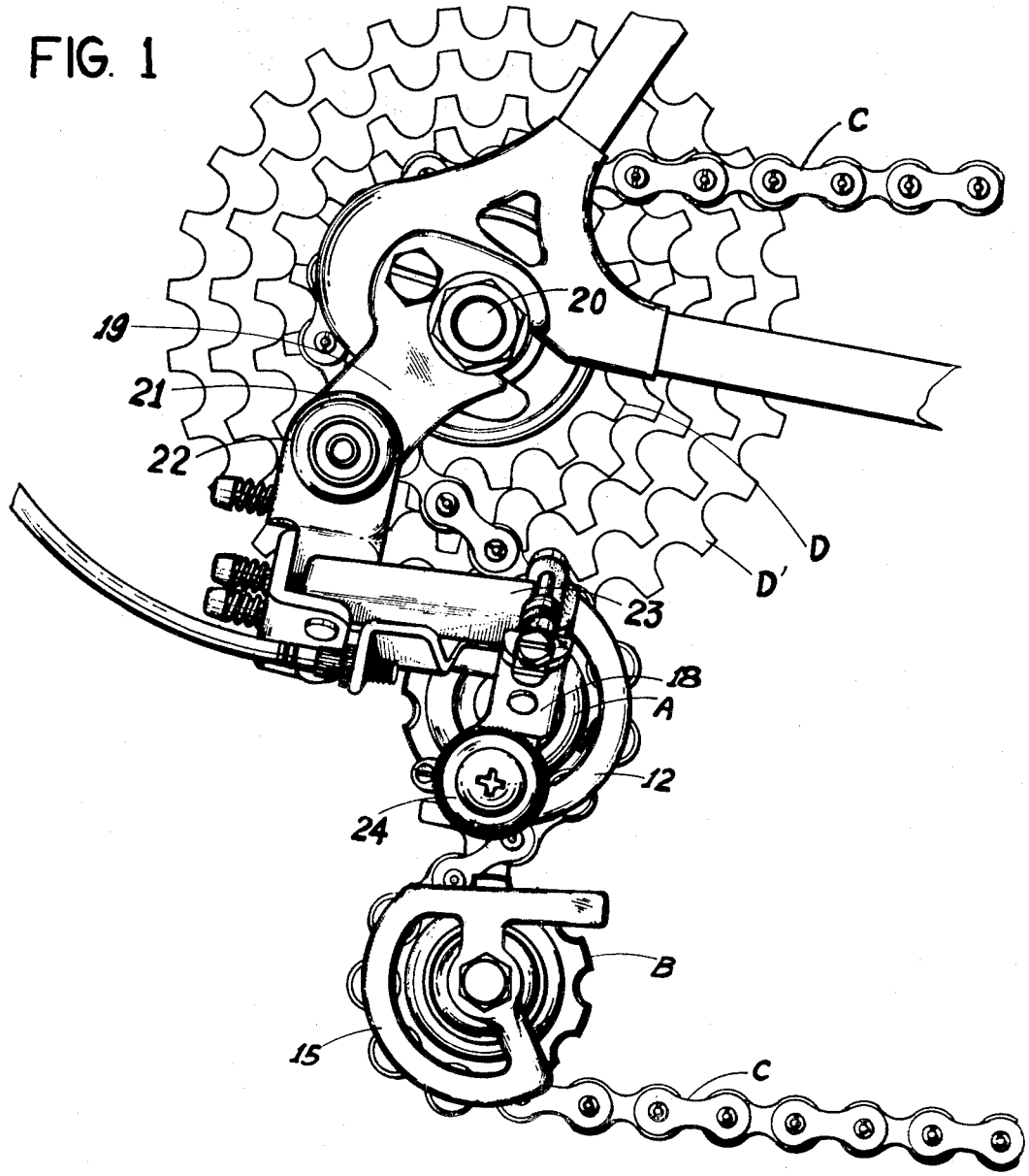

United States Patent [19]

Ozaki

[11] 3,710,636

[45] Jan. 16, 1973

[54] METHOD OF PRODUCING A BICYCLE CHAIN SHIFTING DEVICE AND THE SAME PRODUCED THEREBY

[75] Inventor: Nobuo Ozaki, Osaka, Japan

[73] Assignee: Maeda Industries, Ltd., Osaka, Japan

[22] Filed: June 7, 1971

[21] Appl. No.: 150,556

[30] Foreign Application Priority Data

Nov. 26, 1970 Japan..........................45/117902

[52] U.S. Cl. .................................................74/217 B
[51] Int. Cl...............................................F16h 11/04
[58] Field of Search .....................................74/217 B

[56] References Cited

UNITED STATES PATENTS 2,187,368  1/1940  Todrys...............................74/217 B Primary Examiner—Leonard H. Gerin
Attorney—Ernest G. Montague

[57] ABSTRACT

A method of producing a bicycle chain shifting device by stamping a metallic plate and bending the same in the upright directions thereby integrally forming a chain guard body without using a single piece of connecting means. The invention further involves the products provided in said method.

4 Claims, 6 Drawing Figures

PATENTED JAN 16 1973 3,710,636

SHEET 1 OF 3

INVENTOR
BY
ATTORNEY

PATENTED JAN 16 1973 3,710,636

SHEET 3 OF 3

INVENTOR.
Nobuo Ozaki
BY Ernest F. Montague
ATTORNEY

METHOD OF PRODUCING A BICYCLE CHAIN SHIFTING DEVICE AND THE SAME PRODUCED THEREBY

This invention relates to an improved method of producing a speed change gear for bicycles, and more particularly to such a method that can integrally constitute a chain shifting device of the speed change gear and also to the products manufactured thereby.

In the conventional type of speed change gears, the chain shifting device is mainly composed of a guide pulley that guides the driving chain to a selected free wheel, a tension pulley that transmits the driving force of the chain wheel to said selected free wheel, a chain guard that helps the driving chain be shifted correctly onto said selected free wheel and a spring means that normally maintains the driving chain in a suitably extended condition ready for swift and exact shifting operation.

According to the above-mentioned speed change gears, a cyclist is able to obtain a desired speed rate merely be selectively shifting the speed change gear so that he may drive the bicycle with comfort along the road, ride up the hill or go down along the incline at a desired speed equivalent to a driving force which is required subject to the condition of the road where he is cycling.

However, these conventional types are not free of the deficiencies that each elemental part of the device must be independently manufactured and thereafter assembled into an integral unit to form a main body of chain shifting device through many operational processes, subsequently making the assembling works excessively complicate and causing the assembled unit to get into disorder on many occasions.

Accordingly, an object of the present invention is to provide a method of producing a chain shifting device at a very low cost by stamping a metallic plate to form a chain guard portion after another.

Another object of the invention is to remarkably promote the production efficiency in manufacturing chain shifting devices.

A still another object of the invention is to provide a method of producing a chain shifting device that can operate safely and exactly in a protracted use.

A further object is to provide a method of producing such a chain shifting device that even if the driving chain happens to run over the chain guide pulley, it can be engageable with a correct pulley portion manually from the outsides.

A still further object is to provide the abovementioned chain shifting device.

Figure 2:
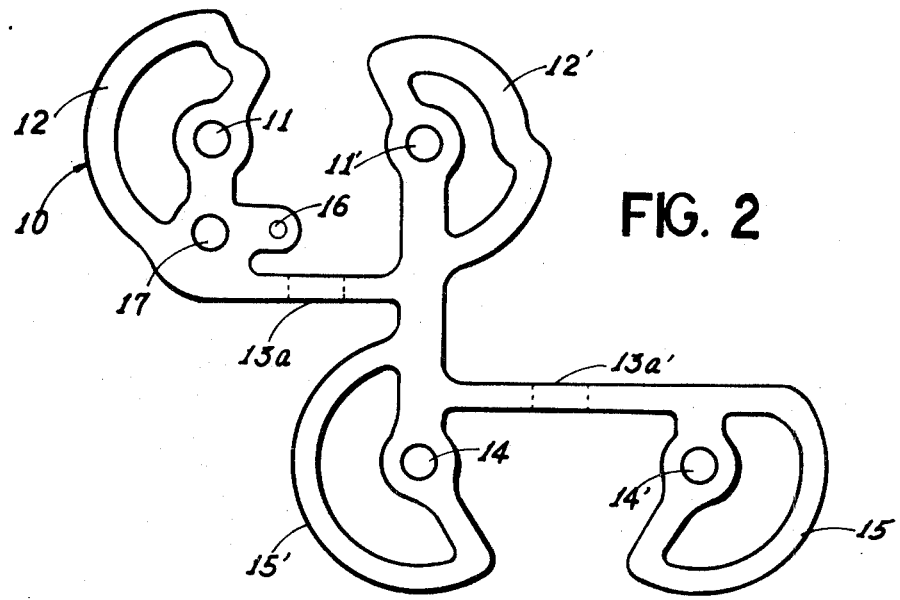
Figure 3:
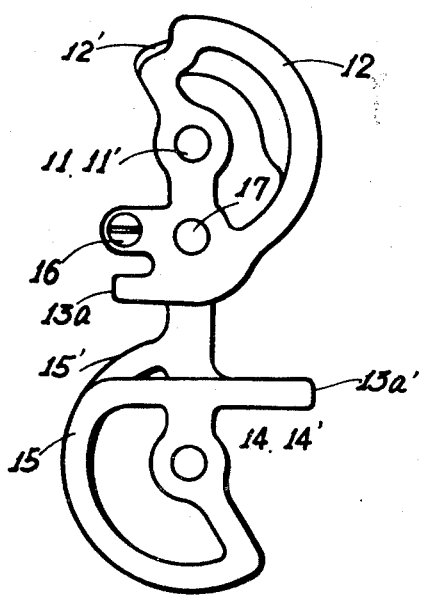
Figure 4:
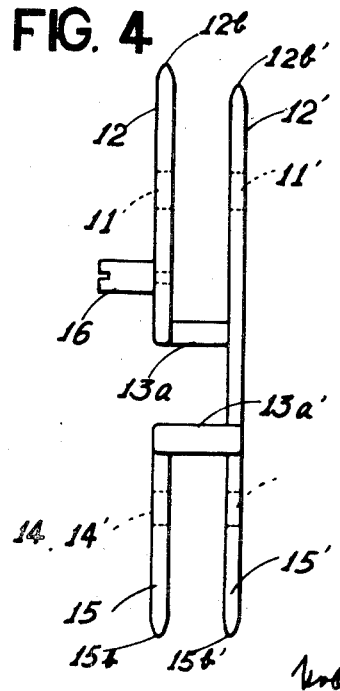
Figure 5:
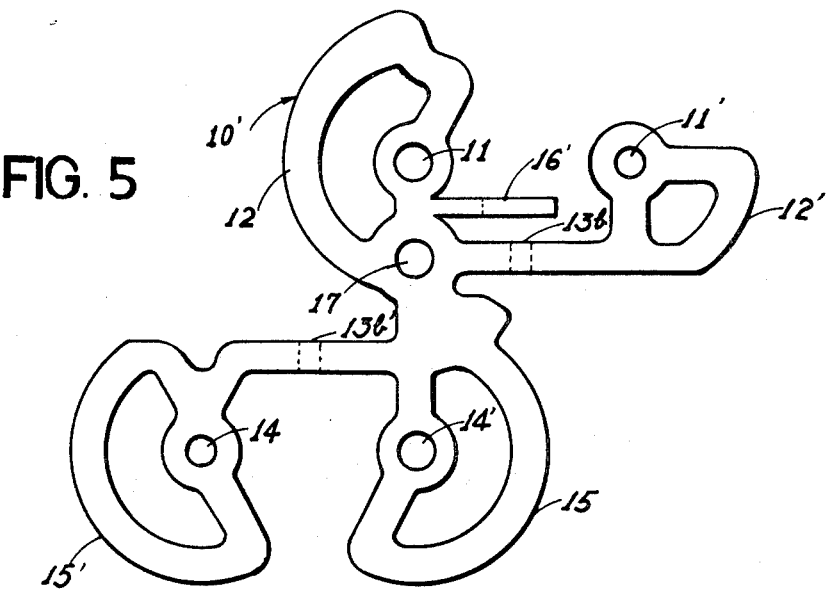
Figure 6:
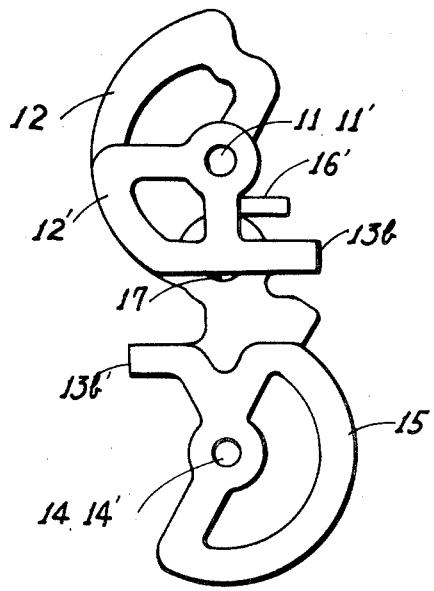

With these and other objects in view, which will become apparent in the following detailed description, the present invention will be clearly understood in connection with the accompanying drawings, in which:

FIG. 1 is a fragmentary elevation showing how to apply the chain shifting device in accordance with the invention, wherein the device is mounted to a bicycle rear wheel hub, with a driving chain extended in engagement with a guide pulley and a tension pulley, FIG. 2 is a development surface view of the chain guard in which the portions to be bent at right angles in one direction are shown in dotted lines, FIG. 3 is a front elevation of the chain guard, in which said portions have been bent to form a main body of the chain guard, FIG. 4 is a side elevation of the chain guard, in which each corresponding part is opposed in parallel, FIG. 5 is a development surface view showing a modified chain guard according to the present invention, in which the portions to be bent in the opposed direction are shown in dotted lines, and FIG. 6 is a front elevation thereof, in which said portions have been bent to form a main body of the chain guard.

Referring now to the drawings, and more particularly to FIGS. 1 through 4, reference numeral 10 generally designates the main body of a chain guard which constitutes the subject matter of the present invention. Said chain guard 10 comprises a pair of guide pulley shaft supporting holes 11 and 11', a pair of semi-circular upper chain guard portions 12, 12', portions to be bent 13a, 13a', a pair of tension pulley supporting holes 14, 14', a pair of semi-circular lower chain guard portions 15, 15', a shaft hole 17 through which said chain guard body 10 is pivotally mounted to a connecting means with a bicycle rear wheel hub.

All the above-mentioned elemental parts 11, 11' to 15, 15' are formed integrally like a labyrinthian circuit by stamping or cutting a single sheet of metallic plate under high pressure as is shown in FIG. 2. In this construction, it is preferable to provide a stopper means 16 at the lower side of the semi-circular upper chain guard portion 12, which stopper means serving to restrain said chain guard portion 12 against the resiliency of a spring means to be described later thereby normally keeping the driving chain in a suitably tensioned condition.

Each of said holes 11, 11' is so provided as to align in the axial direction when said portions 13a, 13a' are bent at right angles so as to form a channel. Likewise, the holes 14, 14' are also opposed to each other in axial alignment when the portions 13a, 13a' are bent in the above-mentioned manner.

As is evident in FIG. 1, a guide pulley A and a tension pulley B are aligned with each other when the former is mounted between the semi-circular upper chain guard portions 12, 12', and the latter is mounted between the semi-circular lower chain guard portions 15, 15', respectively. Said guide pulley A is rotatably mounted between said semi-circular upper chain guard portions 12, 12' by means of a shaft provided through said guide pulley shaft supporting holes 11, 11'. Likewise, said tension pulley B is rotatably mounted between said semi-circular lower chain guard portions 15, 15' by means of a shaft provided through said tension pulley shaft supporting holes 14, 14'.

Thus these pulleys A and B are movable relatively to each other when the driving chain is driven in engaged relation therewith. The length of the portions 13a to be bent is substantially same as that of the portions 13a' to be bent, and when these portions 13a and 13' have been bent at right angles in the same direction to form a channel, they must be wide enough to rotatably support each pulley A, B between the semi-circular upper chain guard portions 12, 12', and between the semi-circular lower chain guard portions 15, 15', respectively.

Furthermore, when the portions 13a, 13a' are bent at right angles to form a channel, the radius of each semi-circular chain guard portion which extends radially from the center of the holes 11, 11' or 14, 14' is slightly larger than that of each pulley as shown in FIG. 1 whereby the driving chain is prevented from running over each pulley.

In order to make it much easier to effect the driving chain shifting operation or in order that the driving chain C is not be caught into said driving chain shifting guard portions, all the above-mentioned semi-circular upper and lower chain guard portions have their peripheral edges 12b, 12b', 15b and 15b' respectively formed into a symmetrically arcuate shape as shown in FIG. 4.

When the driving chain is being shifted, a great force acts without exception upon the semi-circular upper chain guard portion external of the guide pulley whereas the semi-circular upper chain guard portion internal thereof is hardly subject to this force. Thus as is shown in FIG. 2, the semi-circular upper chain guard portion 12' which is to be located at the side of the bicycle body may be smaller in area than its corresponding portion 12 i.e. it needs not be formed in such a shape as corresponds substantially to said semi-circular chain guard portion 12 opposed thereto.

For a fuller understanding, the chain guard portion 12' is adapted to be smaller in radius than the guide pulley A so that even if the driving chain happens to run out of this pulley, a cyclist is able to re-engage the same with this pulley accessibly from the outsides.

As is shown in FIGS. 2 to 4, the guide pulley guard portion and the tension pulley guard portion are bridged at one side only, namely, the semi-circular upper chain guard portions 12' and 15 are integrally formed, whereas the lower chain guard portions 12 and 15' are formed independently of each other with respect to FIG. 4 so that even if the driving chain runs over the pulley A or B, it can be easily re-engaged therewith manually from the outsides.

In FIGS. 5 and 6 is shown another embodiment of the invention in which a modified chain guard 10' is integrally formed, just as in the case with FIG. 2, by stamping a metallic plate under high pressure and bending the same at right angles along the portions 13a, 13a'.

In this case, the distance from the axial line of the holes 11, 14' to an extended line which is tangential to the outermost edge of the semi-circular upper chain guard portion 2 and parallelled to said axial line is substantially equal to the distance from said axial line to an extended line which is tangential to the outermost edge of the semi-circular lower chain guard portion 5' and parallelled to said axial line.

At the present embodiment, reference numeral 16' designates a stopper means formed by bending along the portion 16' at right angle in the opposed direction in which the portions 13a, 13a' are bent.

As has been mentioned, all the above-mentioned arrangements of the driving chain shifting device embodying the present invention can be constructed by stamping or cutting a single sheet of metallic plate under high pressure, and the operational efficiency of the device can be enhanced more remarkably and exactly by combining therewith the mechanism which will be described hereinafter.

The main body of the chain shifting device thus constructed is rigidly fixed to the end of a shaft (not shown) inserted into the lower hole of a suitable bracket 18. Said shaft is in its peripheral wall provided with a spiral spring means resistively restrained against one edge of said lower bracket 18 by said stopper means 16 projected from the semi-circular upper chain guard portion 12 so that the driving chain C is normally in engagement with the pulleys A and B in an equally tensioned condition as is shown in FIG. 1. This illustrated condition is such that the driving chain C is engaged with a minimum diameter, minimum dent-numbered free wheel D that transmits the lowest speed or smallest driving force to the rear wheel.

The whole body of this chain shifting device is rigid-fixed to the rear wheel hub by a hub bolt 20 through a metallic fixture 19. Said metallic fixture is pivotally mounted to the upper portion 21 of a bracket 22 which is connected to a main bracket 23 having said lower bracket 18 carried thereon so that it is possible to adjustably mount this chain shifting device to any type of bicycles. Upon said lower bracket 18 there is provided a spring mechanism 24 wherein a chain tension spring means is adapted.

When the driving chain C is generally to be shifted from the minimum diameter, minimum dent-numbered free wheel D, for example, to the maximum diameter, maximum dent-numbered free wheel D', that is, from the lowest speed to the highest, the driving chain C is forced to run aslant.

According to the device of the present invention, the main body of the device is firstly forced to move forward against the resiliency of said chain tension spring means, and then the main bracket 23 is pressed down against the resiliency of the spring means embedded therein. Accordingly, the driving chain C is normally movable in alignment with the axial direction of the maximum diameter, maximum dent-numbered free wheel D' thereby preventing the driving chain from running thereover. This axial movement of the driving chain C is applicable also to the case where the shifting operation is made from a larger free wheel to a smaller free wheel. regularly spaced between said two free wheels D, D' since the pulleys A and B are arranged to move normally in alignment with the position of a desired free wheel.

While the construction and arrangement of the above-mentioned mechanical parts is rather conventional, it is to be noted that the driving chain shifting device of the present invention in combination with these parts can effect more exact and reliable chain shifting operation.

While I have disclosed two embodiment of the present invention, it is to be understood that these embodiment are given by example only and not in a limiting sense.

I claim:

1. A method of producing a bicycle chain shifting device, comprising the steps of
   stamping a single sheet of a metallic plate in one step, thereby forming an integrally connected chain guard means,
   bending said metallic plate along at least two predetermined bending portions at right angles in one direction, in order to provide at least two integral channel portions, and
   assembling said chain guard means into a completed chain shifting device.

2. The method of producing a bicycle chain shifting device, as set forth in claim 1, which includes the steps of forming an integral stopper means during the said step of stamping a single sheet of metallic plate in one step, and bending said stamped plate along a predetermined bending portion at a substantially right angle, so as to restrain the pivotal movement of said chain guard means.

3. A bicycle chain shifting device, comprising a chain guard body integrally formed of a single sheet of metallic plate, at least two channel portions formed with said chain guard body, at least one bracket means for supporting said chain guard body, at least one connecting means for mounting said chain guard body to said supporting bracket, at least two pulleys engageable with a driving chain, provided in each of said two channel portions, respectively, at least two pulley shafts for rotatably supporting said pulleys, at least two pairs of bores for receiving said two pulley shafts respectively, and at least one spring mechanism for operatively restraining the pivotal movement of said chain guard body.

4. The bicycle chain shifting device, as set forth in claim 3, further comprising an integral stopper means for restraining the pivotal movement of said chain guard body.

* * * * *